United States Patent Office 3,646,204
Patented Feb. 29, 1972

3,646,204
TRIAZINE ANORECTIC METHOD
Abdulmuniem H. Abdallah, Zionsville, Ind., assignor to
The Dow Chemical Company, Midland, Mich.
No Drawing. Filed Feb. 6, 1970, Ser. No. 9,398
Int. Cl. A61k 27/00
U.S. Cl. 424—249   5 Claims

ABSTRACT OF THE DISCLOSURE

This invention relates to a method useful for suppression of appetite and reduction of food intake in animals by means of administering to animals an anorectic amount of 3 - (3,4-dichlorophenoxymethyl)-1,4,5,6-tetrahydro-as-triazine or a pharmacologically-acceptable salt thereof.

BACKGROUND OF THE INVENTION

The compound employed in the method of the invention is described by Trepanier and Harris in U.S. Pat. No. 3,428,635 and by Trepanier in U.S. patent application Ser. No. 598,894, filed Dec. 5, 1966, now Patent No. 3,497,509.

SUMMARY OF THE INVENTION

This invention is directed to a method which comprises administering to an animal an anorectic amount of 3-(3,4 - dichlorophenoxymethyl) - 1,4,5,6-tetrahydro-as-triazine, a pharmcologically-acceptable salt thereof, or a composition containing such substituted triazine or salt as the active anorectic ingredient therein. The method of the invention is particularly useful for suppression of appetite in controlling the food intake and weight of animals, particularly obese mammals or mammals having a tendency toward obesity.

It has been found that 3-(3,4-dichlorophenoxymethyl)-1,4,5,6-tetrahydro-as-triazine and its pharmacologically-acceptable salts have potent anoretic or anorexigenic properties. For the purpose of brevity, 3-(3,4-dichlorophenoxymethyl) - 1,4,5,6 - tetrahydro-as-triazine will be hereinafter referred to as "the triazine compound." The triazine compound is particularly useful for inducing anorexia, or reduced appetite, and can thus be employed in reducing the weight of obese mammals or in maintaining weight in animals having a tendency toward obesity. The triazine compound has relatively little or no stimulant effect on the cardiovascular system or central nervous system at dosages consistent with good anorectic activity. It has an acute LD 50 in mice of about 200 milligrams of the hydrochloride salt of the triazine compound per kilogram of animal body weight by intraperitoneal injection and of about 700 milligrams per kilogram orally. The triazine compound is a crystalline solid which is soluble in a variety of organic solvents such as ether, benzene, chloroform or methylene chloride. The pharmacologically-acceptable salts are crystalline solids which are of varying degrees of solubility in organic solvents and of moderate solubility in water.

As employed herein, the phrase "pharmacologically-acceptable salt" refers to acid addition salts of the triazine compound, the anions of which are relatively non-toxic and innocuous to animals at dosages consistent with good anorectic activity so that side effects ascribable to the anions do not vitiate the beneficial effects of the triazine compound. Suitable pharmacologically-acceptable salts which can be employed in the methods and composition of the invention include those derived from mineral acids such as the hydrochloride, hydrobromide, phosphate, nitrate and sulfate salts, those derived from organic carboxylic acids such as the succinate, tartrate, citrate, malate, maleate, and acetate salts and those derived from organic sulfonic acids such as the methane-sulfonate and toluene-sulfonate salts.

The active triazine compound is preferably employed in the form of a pharmacologically-acceptable salt and the preferred form is the hydrochloride salt. The hydrochloride salt is a crystalline solid melting at 223°–224° C., with decomposition. The triazine compound can be prepared by the reaction of ethyl 3,4-dichlorophenoxy-acetimidate hydrochloride with 2-aminoethyl hydrazine in ethanol as described by Trepanier in a copending U.S. patent application Ser. No. 598,894, filed Dec. 5, 1966, now Pat. No. 3,497,509.

In accordance with the invention, an anorectic amount of the triazine compound or a pharmacologically-acceptable salt thereof is administered to an animal. The administration of an anorectic amount of the triazine compound to an animal brings about a suppression of appetite in the animal. The method of the invention can thus be employed to reduce symptoms and responses to hunger in mammals exhibiting the same, and in reducing food intake by such animals as in reducing or controlling the weight thereof. The method of the invention is advantageously employed by administration of the anorectic amount of triazine compound to a hungry animal, that is, an animal which is predisposed to ingest food due to such factors as training or habituation to a schedule of feeding, duration of time elapsed since previous feeding (starvation), reduced blood sugar levels and/or gastrointestinal motility associated with hunger, stimuli such as scent or sight of food, and the like. Anorexia or suppressed appetite resulting from administration of the required dosage of such compound is usefully manifested by decreased food intake when the treated animal is presented with food during a period in which the appetite of such animal is suppressed by the method of the invention, in the absence of observable side effects or discomfort to the treated animal. Such reduction in food intake, as compared to normal food intake by the same or similar animals, can be utilized in bringing about a desired weight loss or controlling undesired weight gain while alleviating physical discomfort of hunger associated with such decreased food intake.

In a preferred procedure, an anoretic amount of the active triazine compound or a composition containing the same is administered to an obese mammal or a mammal having a tendency toward obesity, such as an animal which, due to habit, physical restraint or limitation, training or other factors consumes food in quantities sufficient to bring about undesired weight gain. The anorectic amount of compound, that is, the amount of the triazine compound sufficient to produce reduced appetite or reduced food intake depends on various factors such as the size, type and age of the animal to be treated, the pharmacologically-acceptable salt employed, the route of administration, the duration of anoretic effect desired, the time the compound is administered relative to prior and subsequent presentation of food, or established feeding patterns or schedules; provided, however, that the animal is administered sufficient of the active triazine compound to provide a substantial reduction in the appetite as indicated by reduction in food intake.

Generally, the compound is administered at dosage rates from about 1 to about 4 to about 25 to about 50 to about 100 to about 200 milligrams of triazine compound per kilogram of animal body weight. When administered by intraperitoneal injection, good results are obtained with an anoretic amount of from about 1 to about 50 or more milligrams of triazine compound per kilogram of animal body weight. From about 1 to 200 milligrams of triazine compound per kilogram, depending on dosage unit form employed, provide excellent results when the compound is administered orally. Dosage units adaptable to oral administration such as tablets, capsules, lozenges, elixirs, syrups and the like are preferred and the active triazine compound can be formulated in conventional timed release capsule or tablet formulations, in which case the preferred dosage per unit is from about 50 milligrams or less to about 300 milligrams or more per unit.

In practicing the method of the invention, the active ingredient is preferably incorporated in a composition comprising a pharmaceutical carrier and from about 5 to about 90 percent by weight of the triazine compound or a pharmacologically-acceptable salt thereof. The term "pharmaceutical carrier" refers to known pharmaceutical excipients useful in formulating pharmacologically-active compounds for internal administration to animals, and which are substantially non-toxic and non-sensitizing under conditions of use. The compositions can be prepared by known techniques for the preparation of tablets, capsules, lozenges, troches, elixirs, syrups, emulsions, dispersions, wettable and effervescent powders, sterile injectable compositions, sterile parenteral compositions for implantation and can contain suitable excipients known to be useful in the preparation of the particular type of composition desired. The compositions are then administered to animals and in particular to obese mammals or to mammals having a tendency toward obesity in an amount sufficient to constitute dosage of said animal with an anoretic amount of the active triazine compound.

Suitable pharmaceutical carriers which can be employed in formulating solid compositions include lactose, glucose, gelatin, rice flour, starch, malt, magnesium carbonate, magnesium stearate and the like and compatible mixtures thereof. Liquid non-toxic carriers which can be employed in preparing liquid compositions include ethanol, propylene glycol, water, glycerine, normal saline, glucose syrup of acacia, mucilage of tragacanth and the like and compatible mixtures thereof. Oil-in-water and water-in-oil emulsions can be prepared with edible oils such as peanut oil, wheat germ oil, corn oil, arachis oil, olive oil or the like and with the aid of emulsifying agents such as lecithin, sorbitan trioleate, polyoxyethylene sorbitan monooleate, gum acacia and the like. Suspensions can be prepared with the aid of suspending agents such as methyl cellulose, carboxymethyl cellulose, hydroxypropylmethyl cellulose and polyethyleneoxide condensation products with alkylphenols, fatty acids or fatty alcohols and the like and compatible mixtures thereof. Preferred compositions contain either a suspending agent or an emulsifying agent, or both. The compositions can also contain sweetening agents such as sugar or sodium saccharin, flavoring agents such as licorice, coloring materials such as caramel, preservatives and the like. The active ingredient can also be incorporated in sterile parenteral compositions for intraperitoneal, intramuscular, intravenous or subcutaneous injection. Such compositions are preferably prepared with pharmaceutical carriers such as water, normal saline and the sterile injectable suspensions can also include suspending agents such as those listed above.

DESCRIPTION OF PREFERRED EMBODIMENTS

The following examples illustrate the invention but are not to be construed as limiting the same.

Example 1

Sterile injectable compositions comprising 3-(3,4-dichlorophenoxymethyl) - 1,4,5,6-tetrahydro-as-triazine hydrochloride in a 0.5 percent aqueous hydroxypropyl methyl cellulose suspension are prepared and administered to groups of mice. The compound is administered at various dosage rates by intraperitoneal injection. Prior to administration of the triazine compound the mice have been trained to eat a conventional rodent chow during a six hour period daily, the mice being presented with water and libitum, but no food during the remaining 18 hours each day. The triazine compound is administered about 17 to 18 hours following the end of the latest feeding period. After administration of the compound the mice in each group are presented with a weighed amount of rodent chow. Feed consumption is determined after two hours and six hours, respectively, by weighing the rodent chow remaining at such times and recording the difference in weight between feed presented and feed remaining as food consumption or food intake. Separate groups of similar mice are similarly trained, starved and presented with food to serve as a check. However, the check groups are administered only a 0.5 percent aqueous hydroxypropyl methyl cellulose suspension containing no triazine compound. The check groups of mice are observed to have consumed an average of 4.6 and 8.8 grams of rodent mash per group two and six hours, respectively, after beginning of feeding. In contrast, groups of mice administered 3 - (3,4-dichlorophenoxymethyl)-1,4,5,6-tetrahydro-as-triazine hydrochloride at a dosage rate of 4.6 milligrams of said compound per kilogram of animal body weight are found two and six hours after presentation of the rodent chow to have consumed an average of 3.2 and 8.0 grams, respectively, of feed per group. Such results represent reductions of about 30 and about 9 percent, respectively, in food intake. Separate groups of mice administered 46 milligrams of the triazine compound per kilogram are observed to have an average food intake of 1.2 grams of food per group after 2 hours, and an average food intake of 6.3 grams after 6 hours, corresponding to 74 and 29 percent, respectively, reduction of food intake.

Example 2

Other operations are carried out in a procedure similar to the procedure of Example 1 using three series of test groups of mice administered 21, 46 or 100 milligrams, respectively, of the 3-(3,4-dichlorophenoxymethyl)-1,4,5,6-tetrahydro-as-triazine hydrochloride per kilogram by intraperitoneal injection and separate series of check groups of mice of the same origin and past history as the test groups. Two hours after beginning feeding, reductions in food intake of 27, 32 and 45 percent are observed in the test groups administered the test compound at dosage rates of 21, 46 and 100 milligrams per kilogram, respectively.

In similar operations carried out with autothioglucose obese mice, reductions in food intake of 80 and 56 percent, respectively, are obtained two and six hours, respectively, after intraperitoneal administration of the triazine compound in an amount corresponding to 100 milligrams per kilogram. The dosage rate is expressed in terms of the body weight of non-obese mice of similar origin and age.

Example 3

In a procedure similar to that of Example 1, test groups of mice are administered the triazine composition orally at a dosage rate of 10 milligrams of 3-(3,4-dichlorophenoxymethyl)-1,4,5,6 - tetrahydro-as-triazine hydrochloride per kilogram. Reductions of food intake amounting to 31 and 20 percent, respectively, as compared to the food intake of untreated check mice, are observed two and six hours, respectively, after the beginning of feeding.

In similar operations, percentage reductions in food intake as compared to check mice of 16, 21, 23 and 40 percent, respectively, are obtained two hours after beginning feeding when the triazine compound is administered orally in amounts of 10, 16, 25 and 40 milligrams of the hydrochloride salt, respectively, per kilogram.

Example 4

Separate groups of rats are presented with milk, and the milk consumption of each rat during a thirty minute period on two successive days prior to administration of a test compound is recorded. Milk consumption during a comparable thirty minute period following administration of a test compound is recorded, and the average milk intake before and after administration of the test compound is compared. In such operations, separate groups of rats having average pretreatment milk intake rates of 10.6, 12.4 and 13.2 milliliters in 30 minutes are administered 3 - (3,4-dichlorophenoxymethyl)-1,4,5,6-tetrahydro-as-triazine orally in amounts of 46, 100 and 150 milligrams per kilogram, respectively, and are then observed to have average post-treatment milk intake rates of 5.7, 7.3 and 6.0 milliliters of milk in 30 minutes.

Example 5

Mongrel dogs are starved overnight and are then orally administered 3-(3,4-dichlorophenoxymethyl)-1,4,5,6-tetrahydro-as-triazine hydrochloride at a dosage rate of 8 or 10 milligrams per kilogram. Six dogs are administered the test compound in gelatin capsules at each rate. At 30-minute intervals following administration, each dog is presented a small portion of a meat and cereal dog ration. In similar untreated check dogs, the food portion is uniformly consumed within about 30 minutes of presentation each time such food is presented. When a dog fails to ingest the food portion within 30 minutes after presentation, the food portion is replaced with a fresh portion and the observation is recorded as an anoretic effect, the time of such observation being recorded as time for onset of anoretic activity. Presentation of the food portions is continued until the dog consumes a food portion when presented. The time interval between onset of anoretic activity and consumption of food when presented is recorded as duration of anoretic activity. The average time for onset of anorectic activity in the dogs administered 8 milligrams of the test compound per kilogram is observed to be 1.75 hours and the average duration of activity observed is 2.9 hours. In the dogs administered 10 milligrams of triazine compound per kilogram, the average time for onset of anorectic activity is 1.7 hours and the average duration of activity is observed to be 3.2 hours.

Example 6

Cats are trained to eat their daily ration of a conventional cat chow in a single portion presented to the animals during a one hour period each day. The animals are given water ad libitum, but no food during the remaining 23 hours daily. Immediately prior to feeding (22–23 hours after the last feeding) separate groups of cats so trained and prepared are administered 3-(3,4-dichlorophenoxymethyl)-1,4,5,6-tetrahydro-as-triazine hydrochloride per os at various dosage rates. Food intake during the one hour feeding period is measured and compared with the food intake during the one hour feeding period on the day prior to treatment. An $ED_{50}$, calculated as the dosage effective to reduce food intake by 25 percent or more in 50 percent of the cats, for 3-(3,4-dichlorophenoxymethyl)-1,4,5,6-tetrahydro-as-triazine hydrochloride is found to be 8 milligrams per kilogram. No emesis, nausea or symptoms or responses other than anorexia are observed in any of the cats.

Example 7

Tablets are prepared by mixing together 4 parts by weight each of glyceryl monostearate, calcium sulfate and gum Karaya, 3 parts by weight of talc and 4 parts by weight of 3-(3,4-dichlorophenoxymethyl)-1,4,5,6-tetrahydro-as-triazine maleate. 0.1 part of magnesium stearate and one part of talc are added and the mixture is compressed into slugs, which are broken into granules. The granules are sieved with an eight mesh screen, mixed with additional talc (0.15 part by weight) and magnesium stearate (0.04 part by weight) and compressed into tablets weighing 400 milligrams each.

Example 8

Three groups of obese adult mongrel dogs are maintained on a diet of high caloric content by feeding twice daily a conventional puppy chow with an added high carbohydrate-high fat gravy. One week after feeding on the high caloric diet, the dogs in one group (A) are placed on a regimen comprising oral administration of 3-(3,4-dichlorophenoxymethyl) - 1,4,5,6 - tetrahydro - as - triazine maleate, in the tablet form of Example 7. One tablet is administered to each dog twice daily, two hours before feeding. The dogs in a second group (B) are administered 3-(3,4 - dichlorophenoxymethyl) - 1,4,5,6 - tetrahydro-as-triazine hydrobromide at a dosage rate of 10 milligrams per kilogram, administered orally in a hard gelatin capsule twice daily, two hours prior to feeding. The third group of dogs (C) is not administered any test compound to serve as a check. Observations of food intake indicate substantial reductions in food intake in the dogs of groups A and B as compared in those in group C and as compared to groups A and B during the period prior to beginning administration of the test compound. Observations of animal body weight at weekly intervals after administration of the test compound is begun indicate loss of weight in the obese dogs of groups A and B, as compared to pretest weights, with no weight loss in the untreated check dogs of group C.

Example 9

15 parts by weight of 3-(3,4-dichlorophenoxymethyl)-1,4,5,6-tetrahydro-as-triazine hydrochloride, 100 parts of corn starch and 3 parts of magnesium stearate are intimately mixed together and the mixture is compressed into slugs. The slugs are broken into granules which are passed through an eight mesh screen and coated with sufficient of a solution of 15 parts of shellac and 3 parts of castor oil in 800 parts of ethanol to coat the granules. Three parts of magnesium stearate are then added to the coated granules after which they are compressed into tablets weighing 750 milligrams each. The tablets are adapted to be administered to animals, such as obese mammals, in which reduction of food intake is desired.

I claim:

1. A method for reducing the food intake of obese animals, comprising administering orally to an obese animal an anorectic amount of a compound selected from the group consisting of 3-(3,4-dichlorophenoxymethyl)-1,4,5,6-tetrahydro-as-triazine and the pharmacologically-acceptable salts thereof.

2. The method of claim 1 wherein the compound is 3-(3,4-dichlorophenoxymethyl)-1,4,5,6 - tetrahydro - as - triazine hydrochloride.

3. The method of claim 1 wherein the compound is administered at a dosage rate from about 1 to about 200 milligrams per kilogram of animal body weight.

4. The method of claim 1 wherein the compound is administered prior to presenting the animal with food, and further comprising the step of thereafter presenting the animal with food during a period in which the appetite of said animal is suppressed, whereby the food intake of said animal is reduced.

5. The method of claim 4 wherein the steps of administering said compound and presenting food are repeated for a time sufficient to bring about a desired weight loss by said animal.

References Cited

UNITED STATES PATENTS

| | | | |
|---|---|---|---|
| 3,428,635 | 2/1969 | Trepanier et al. | 260—248 AS |
| 3,497,509 | 2/1970 | Trepanier | 260—248 AS |
| 3,471,487 | 10/1969 | Trepanier | 424—249 |

ALBERT T. MEYERS, Primary Examiner

N. A. DREZIN, Assistant Examiner